Feb. 17, 1931.  G. E. HILLIARD  1,793,441
METHOD OF TREATING STEEL SCRAP IN OPEN HEARTH FURNACES
Filed April 4, 1928
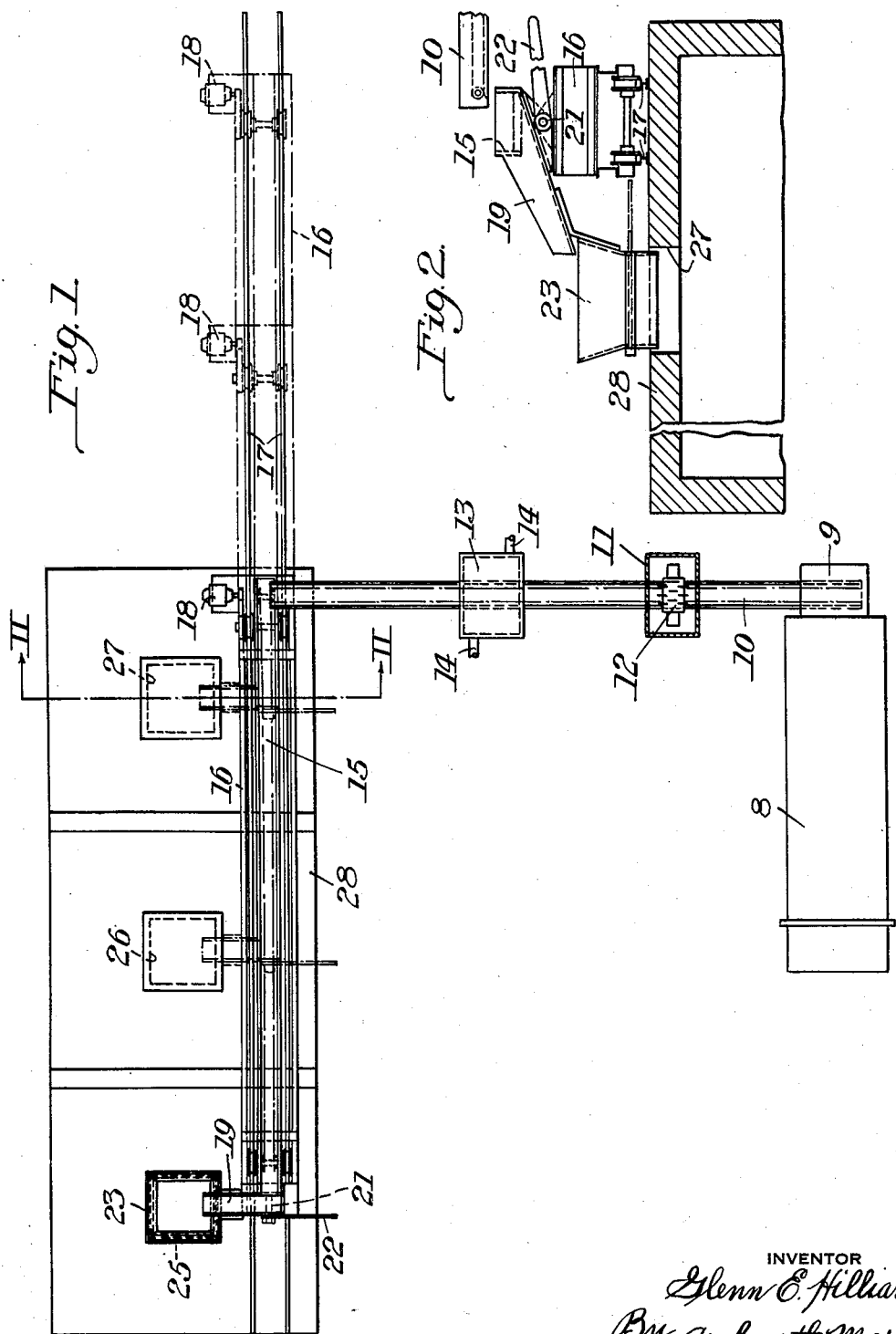
INVENTOR
Glenn E. Hilliard
By Archworth Martin,
Attorney.

Patented Feb. 17, 1931

1,793,441

UNITED STATES PATENT OFFICE

GLENN E. HILLIARD, OF BRACKENRIDGE, PENNSYLVANIA

METHOD OF TREATING STEEL SCRAP IN OPEN-HEARTH FURNACES

Application filed April 4, 1928. Serial No. 267,462.

My invention relates to a method of and apparatus for charging metallurgical furnaces and is more particularly designed for the charging of open hearth furnaces, although it is susceptible of use in various other relations.

Heretofore, open hearth furnaces have been commonly charged by introducing billets or the like through charging doors at the fronts of the furnaces, by means of charging machines. In most plants, an effort is made to utilize metal scrap such as lathe turnings, in lieu of, or to supplement the billets or other material entering into a charge. Lathe turnings in the form of shavings or chips, as well as various other kinds of light scrap, are quite acceptable for use as openhearth furnace charges, and are desirable in that they can be purchased at a much lower price than the billets, pig iron, or the like that are most commonly used.

However, there have been a number of practical difficulties encountered in utilizing fine scrap material. In the first place, a mass thereof may contain considerable moisture which will result in explosions, if it is suddenly dumped into the furnace in a mass, without previously drying. Also, a mass of such material contains a large amount of pore space, wherein the air serves as a heat insulator and retards heating and melting of the mid portion of the mass. Therefore, not only is considerable time consumed in reducing the mass to a molten condition, but there is a considerable loss of heat through failure of the mass to absorb heat readily from the heated gases that are passed through the furnace, with the result that the gases are not made to give up enough of their heat while passing through the furnace. For instance, the heated gases, when entering the furnace, may have a temperature of about 2700° F. and when leaving the furnace will have a temperature of perhaps as much as 2500° F. Further, the oxygen and nitrogen of any occluded air will become dissolved and substantially retained in the molten steel, and it is well known that such dissolved gases are exceptionally harmful to the product. By charging the scrap in the manner described in this specification, I prevent the presence of this volume of entrapped air and thereby avoid the possibility of its oxygen and nitrogen content becoming dissolved gases in the molten metal, thus securing a resultant superior product.

Furthermore, the scrap material is of relatively low weight per unit of volume, so that large quantities thereof must be introduced into a furnace in order to fully charge the furnace. When the material is introduced through the front doors of the furnace, a considerable number of charging buggies or cars are required to carry a complete charge and many times charging is interrupted until one mass introduced into the furnace has been melted down sufficiently to leave room for the additional quantities necessary to complete the charge. Again, so many buggy loads of the materials are required that there is considerable shifting of the cars necessary in order to bring loaded cars into charging position and to remove the empty cars, with not only increased labor cost, but the space required is such that there is interference with operations at furnaces adjacent to the one being charged.

My invention has for one of its objects the provision of means and a method whereby the material is so handed and is introduced into the furnace in such manner that the various objections above enumerated are avoided, as will hereinafter appear.

Still another object of my invention is to simplify and improve generally the operations of handling material and the introduction thereof into open hearth furnaces or other receptacles.

One form of apparatus by which my invention may be practiced is shown in the accompanying drawing, wherein Figure 1 is a plan view, and Fig. 2 is a view taken on the line II—II of Fig. 1.

Referring to Fig. 1, I show somewhat diagrammatically the principal steps which are taken in the practice of the invention. A storage bin or the like is represented at 8 from which material is loaded at 9 to a conveyor 10. The conveyor 10 passes through a hood or chamber 11, wherein the masses of material whose particles tend to cling together to form a somewhat unitary mass, is spread by teeth on a roll 12 which is driven from a suitable source of power in such direction that the teeth of the roll as they engage the mass will be moved in a direction opposite to that in which the mass is being carried by the conveyor 10. The conveyor passes through a drying box 13 that is heated by gas burner pipes 14 or in any other suitable manner, the material being more readily dried than if it had not been previously spread by the roll 12.

The conveyor 10 discharges to a conveyor 15 that is mounted on a carriage 16 which travels on tracks 17. The conveyor 15 is driven by a motor 18 also mounted on the carriage. The motor 18 has suitable driving connection with one of the wheels of the carriage 16. The discharge end of the conveyor is directed through a path at right angles to the main portion of the conveyor, and the extended conveyor frame portion 19 is pivotally connected to the main conveyor frame as indicated at 21. A handle 22 is secured to the conveyor section 19 so that the outer end thereof may be oscillated vertically.

The conveyor section 19 carries a hopper 23 into which the conveyor 15 discharges. By manipulation of the handle 22, the hopper 23 may therefore be lowered and raised into and out of charging openings 25, 26, 27 in the roof of a furnace 28, the charging openings being closed by suitable cover plates, when no material is being introduced therethrough.

When it is desired to charge the furnace 28, the scrap material is loaded to the conveyor 10, the masses thereof spread by the roller 12, and the material then dried, as above explained, to not only avoid explosions in the furnace through introductions of large wet masses of material but to permit introduction thereof into the furnace in the form of a stream. By reason of the intense heat of the furnace, the scrap will be heated to nearly melting temperatures as fast as it flows through the charging openings.

The mounting of the conveyor 15 upon a traveling carriage permits distribution of the material throughout the length of the furnace, so that the furnace can be charged more readily and thus avoid the waiting periods that are necessary where a large loose mass must be melted down before there is room to introduce the additional quantities necessary to complete a charge.

By my method of charging scrap metal turnings, or other finely divided material, the occluded air is consumed by the flame of the furnace as the stream of material enters the furnace, thus avoiding objectionable reaction of the oxygen with the metal through presence of such oxygen beneath a large mass of material. Furthermore, in many cases, it is customary in charging the turnings to utilize them for only a portion of the charge, pig iron or other bars being piled upon the mass of turnings in the furnace. If the turnings have been charged in masses as by dumping from buggies or charging boxes, they are comparatively cold when the bars are piled on them, thus requiring a much longer time to melt the charge, as heretofore indicated.

Another advantage resulting from the use of my invention arises from the fact that it is not necessary to pile the turnings approximately to the roof, since by my method the heat of the flames is largely absorbed by the turnings as they are slowly fed into the furnace and the heat at the furnace roof will therefore not be so intense as if the turnings were charged in masses and the heat consequently deflected against the roof, thus making for longer life of the furnace roof.

I claim as my invention:—

The method which comprises introducing fine metal scrap into open hearth furnaces, in the form of a free-falling stream of such volume and at such rate that the occluded air will be consumed by the furnace gases while the said scrap is moving into charged position.

In testimony whereof I, the said GLENN E. HILLIARD, have hereunto set my hand.

GLENN E. HILLIARD.